United States Patent Office 3,193,540
Patented July 6, 1965

3,193,540
PROCESS OF POLYMERIZING METHYL
METHACRYLATE
Abraham Kutner, Brookside Park, Del., assignor to Hercules Powder Company, Wilmington, Del., a corporation of Delaware
No Drawing. Filed Sept. 30, 1957, Ser. No. 686,849
2 Claims. (Cl. 260—89.5)

This invention relates to a new process for the polymerization of methyl methacrylate.

It is well known that methyl methacrylate may be polymerized in bulk, solution, suspension, or emulsion polymerization systems with free radical-type catalysts, as for example, peroxides, persulfates, azo initiators, etc.

Now in accordance with this invention it has been found that methyl methacrylate may be polymerized by contacting it with an organometallic compound of a metal of Group V–A of the Periodic Table as the sole catalyst or in combination with a compound of a transition metal. By means of the process of this invention it is possible to produce a poly(methyl methacrylate) of higher density than the prior art poly(methyl methacrylate)s and which may also be a crystalline polymer exhibiting a crystalline-type X-ray diffraction powder pattern.

Any organometallic compound of a metal of Group V–A of the Periodic Table, i.e., of arsenic, antimony or bismuth may be used to catalyze the polymerization of methyl methacrylate in accordance with this invention. Exemplary of the organometallic compounds that may be used are the bismuth, antimony, or arsenic trialkyls such as the trimethyl, triethyl, triisopropyl, triisobutyl, and tri-sec-butyl compounds, etc.

While the Group V–A metal alkyl may be used as the sole catalyst, it is frequently advantageous to use it in combination with a transition metal compound, i.e., a compound of a metal of Groups IV–B, V–B, VI–B, VII–B and VIII of the Periodic Table. Use of a transition metal compound in combination with the Group V–A metal alkyl makes it possible to produce a wide range of molecular weights (or viscosities) of the polymer. It is also possible by this combination to produce a polymer having a high degree of crystallinity as shown by its X-ray diffraction powder pattern. Any inorganic or organic salt or complex of the transition metal may be used. Exemplary of such transition metal compounds that may be used are titanium tetrachloride, zirconium tetrachloride, titanium trichloride, vanadium tetrachloride, vanadium trichloride, vanadium trifluoride, vanadium oxychloride, vanadium oxydichloride, tantalum pentachloride, molybdenum trichloride, molybdenum pentachloride, chromium dichloride, chromium trichloride, ferric chloride, manganese dichloride, vanadium trioxide, vanadium pentoxide, chromium oxide, vanadium oxyacetylacetonate, chromium acetylacetonate, cobalt acetylacetonate, iron acetylacetonate, manganese acetylacetonate, alkyl vanadates, alkyl titanates, etc.

The polymerization of methyl methacrylate in accordance with this invention may be carried out in a variety of ways. The process may be a batch or continuous operation and may be carried out with or without the use of an inert organic diluent as the reaction medium. Any inert liquid organic diluent may be used, as for example, aliphatic hydrocarbons such as hexane, heptane, etc., cycloaliphatic hydrocarbons such as cyclohexane, aromatic hydrocarbons such as benzene, toluene, xylene, etc., or any mixture of such hydrocarbons, halogenated hydrocarbons such as ethyl chloride, methyl chloride, methylene chloride, ethylene chloride, chlorobenzene, and aliphatic ethers, cycloaliphatic ethers, aromatic ethers, and cyclic ethers, as for example, diethyl ether, dioxane, tetrahydrofuran, etc.

The selection of the temperature and pressure used for the polymerization process will obviously depend upon the activity of the catalyst system being used, the diluent used, the degree of polymerization desired, etc. In general, the polymerization will be carried out at room temperature or slightly above, but any temperature within the range of from about −50° C. to about 150° C., and preferably from about −20° C. to about 100° C., may be used. In the same way, while atmospheric pressure or a pressure of only a few pounds may be used, the polymerization may be carried out under a wide range of pressures, as for example, from a partial vacuum to about 1000 pounds and preferably from about atmospheric to about 500 pounds pressure. Higher pressures may, of course, be used but generally do not appreciably alter the course of the polymerization.

In carrying out the polymerization of the methyl methacrylate with the combination of a compound of a transition metal with the Group V–A metal alkyl, it is usually preferable to utilize the transition metal compound in a finely divided form. Such a finely divided form is obtained when the transition metal compound is reduced with an organometallic compound prior to the polymerization. Another means of obtaining a finely divided form of the transition metal compound is to subject it to a ball-milling operation carried out in an inert diluent. By such means it is possible to produce almost any desired particle size.

Any mode of introducing the catalyst into the polymerization system may be utilized. Usually the Group V–A metal alkyl and the transition metal compound are added in the form of solutions or suspensions in inert organic diluents. When the combination of Group V–A metal alkyl and transition metal compound is used, either one may be introduced into the system followed by the second or they may be introduced simultaneously, or added in increments or continuously throughout the polymerization or they may be mixed together to prepare a preformed catalyst which may be heat treated or allowed to age, etc., as desired.

The amount of catalyst used in the polymerization of methyl methacrylate in accordance with this invention may be varied over a wide range from a minor catalytic amount to a large excess. In general, the amount of Group V–A metal alkyl will be from about 0.1% to about 10% by weight of the monomer and preferably will be from about 0.5% to about 5%. When the Group V–A metal alkyl is used in combination with a transition metal compound, the molar ratio of the two catalyst components will generally be within the range of from about 0.1:1 to 10:1 and preferably will be from about 0.5:1 to 4:1.

The process of this invention has many advantages over the prior art processes of polymerizing methyl methacrylate. In general, the density of the polymer is higher than in the case of the prior art poly(methyl methacrylate)s. Hence, objects molded from the polymers produced by the process of this invention have higher impact strength, toughness and hardness than those made from the prior art poly(methyl methacrylate)s. In addition, the proper choice and proportion of Group V–A metal alkyl to transition metal compound, when such a combination is used, makes it possible to not only control the viscosity of the polymer and conversion thereto, but also enables the preparation of a polymer exhibiting a high degree of crystallinity.

crystalline as shown by their X-ray diffraction powder patterns, the polymer of Example 5 having a particularly high degree of crystallinity.

Table

| Example | Group V-A Metal Alkyl | Parts | Transition Metal Compound | Parts | Temp., °C. | Crude Polymer | | Specific Viscosity of Extracted Polymer |
|---|---|---|---|---|---|---|---|---|
| | | | | | | Percent Conv. | Specific Viscosity | |
| 1 | SbEt$_3$ | 0.104 | | | 30 | 46.8 | 2.4 | 8.4 |
| 2 | SbEt$_3$ | 0.104 | MnCl$_2$ | 0.03 | 30 | 40.4 | 7.2 | 5.9 |
| 3 | SbEt$_3$ | 0.05 | | | 60 | 16 | 7.8 | 6.9 |
| 4 | BiEt$_3$ | 0.148 | | | 30 | 45.4 | 1.2 | 1.0 |
| 5 | BiEt$_3$ | 0.148 | TiCl$_3$ | 0.04 | 30 | 18.6 | 0.4 | 0.4 |
| 6 | BiEt$_3$ | 0.148 | MnCl$_2$ | 0.03 | 30 | 90.6 | 4.2 | 3.3 |
| 7 | BiEt$_3$ | 0.074 | MnCl$_2$ | 0.02 | 60 | 38 | 8.0 | 5.2 |

The Periodic Chart used in this specification and appended claims for designating the groups and subgroups of the Periodic Table is that given in the "Handbook of Chemistry and Physics," published by Chemical Rubber Publishing Company, Cleveland, Ohio, on pages 392-3 of the 36th edition.

The following examples will illustrate the process of preparing poly(methyl methacrylate) in accordance with this invention. All parts and percentages are by weight unless otherwise indicated.

EXAMPLES 1-7

Each of a series of polymerization vessels from which the air had been removed was charged with 3 parts n-heptane, 5 parts of methyl methacrylate and after equilibrating at the reaction temperature, 30° C. in the case of Examples 1, 2 and 4-6 and 60° C. in the case of Examples 3 and 7, the catalyst was added. In Examples 2 and 5-7 where the organometallic compound was used in combination with a transition metal compound, the Group V-A metal alkyl was added first followed by the transition metal compound. In each case the transition metal compound had been ball milled in heptane. The organometallic compound and transition metal compound and amount of each used are tabulated below. After 20 hours at the reaction temperature, the insoluble polymer which had separated was collected, slurried with ethanol, filtered and dried. It was then dissolved in methylene chloride and after filtering the solution, the polymer was reprecipitated by adding a large volume of ethanol. The percent conversion and specific viscosity of this crude product as determined on a solution in ethylene chloride at 25° C. are given in the following table. The crude polymer was then extracted with a mixture of 20 parts of methyl isobutyl ketone and 4 parts of heptane for every part of polymer and again dried in vacuum for 16 hours. The specific viscosity of the so-extracted polymer as determined on a solution in ethylene chloride at 25° C. is also set forth in the table below. The polymers produced in Examples 4-6 were

What I claim and desire to protect by Letters Patent is:

1. The process of preparing crystalline poly(methyl methacrylate) which consists in contacting methyl methacrylate, as the sole polymerizable material, at a temperature of from about −50° C. to about 150° C. and in the presence of an inert liquid organic diluent, with from about 0.1 to about 10% by weight based on the methyl methacrylate of a trialkyl bismuth as the sole polymerization catalyst.

2. The process of claim 1 wherein the trialkyl bismuth is triethyl bismuth.

References Cited by the Examiner

UNITED STATES PATENTS

| | | | |
|---|---|---|---|
| 2,675,372 | 4/54 | Coover et al. | 260—89.7 |
| 2,832,759 | 4/58 | Nowlin et al. | 260—949 |
| 2,833,741 | 5/58 | Lal et al. | 260—89.5 |
| 2,840,617 | 6/58 | Shokal | 252—431 |
| 2,841,574 | 7/58 | Foster | 260—67 |
| 2,924,589 | 2/60 | Jurgeleit | 260—88.7 |
| 2,956,990 | 10/60 | Fettes | 260—89.5 |

FOREIGN PATENTS 545,968  9/56  Belgium.

OTHER REFERENCES

Pauling: General Chemistry, Freeman (1947), pages 61 and 412–416.

Partington: Text-Book of Inorganic Chemistry, MacMillan (1953), pages 367–369 and pages 848–850.

Handbook of Chemistry and Physics (vol. 37), page 393, published by Chemical Rubber Publishing Co., Cleveland, Ohio.

Schildknecht: Polymer Processes, pub. by Interscience Publishers, Inc. (New York), 1956, page 222 relied upon.

JOSEPH L. SCHOFER, *Primary Examiner.*

DANIEL ARNOLD, MILTON STERMAN,
PHILIP E. MANGAN, LOUISE P. QUAST,
*Examiners.*